United States Patent [19]

Garrioch

[11] Patent Number: 5,451,465
[45] Date of Patent: Sep. 19, 1995

[54] STRUCTURAL GLASS

[75] Inventor: Neil H. G. Garrioch, Cambridge, Mass.

[73] Assignee: Robin D. Goldstein, Palo Alta, Calif.

[21] Appl. No.: 338,888

[22] Filed: Nov. 14, 1994

Related U.S. Application Data

[63] Continuation of Ser. No. 30,668, Mar. 12, 1993, abandoned.

[51] Int. Cl.⁶ ............................................. B32B 17/06
[52] U.S. Cl. ..................................... 428/426; 428/38; 428/39; 428/174; 428/225; 428/241; 65/22; 65/102; 501/32; 501/39
[58] Field of Search .................... 428/426, 38, 39, 174, 428/225, 241; 65/22, 102; 501/32, 39

[56] References Cited

U.S. PATENT DOCUMENTS

| | | | |
|---|---|---|---|
| 3,874,861 | 4/1975 | Kurz | 65/20 |
| 3,960,532 | 6/1976 | Lazet | 65/22 |
| 4,192,664 | 3/1980 | Joshi | 65/22 |
| 4,430,107 | 2/1984 | Dennert et al. | 65/22 |
| 4,430,108 | 2/1984 | Hojaji et al. | 65/22 |
| 4,826,788 | 5/1989 | Dennert et al. | 501/39 |
| 5,269,977 | 12/1993 | Nakahashi et al. | 264/1.9 |

OTHER PUBLICATIONS

Cellular Solids–Gibson & Ashby Pergamon Press–1988.
The Japan Architect–Winter 1992-1 Published Mar. 15, 1992 Results: Another Glass House–pp. 50,51.
Continuum Theory of The Mechanics of Fibre-Reinforced Composites–#282 A. J. M. Spencer–Springer Verlag–New York–1984.
Mechanics of Cellular Plastics–N. C. Hilyard Macmillian Publishers–New York–1982.
Foamglas® Insulation Systems–Data Sheet Pittsburgh–Corning–1992.
Foamglas® HCB Cellular Glass For The Insulation of Liquified Gas Tank Bases Pittsburg Corning–Application Note–Jun. 1986.
Composite Materials–Testing & Design–Eigth Conference John Whitcomb–ASTM–1988.
Mechanical Properties of Porous and Cellular Materials Materials Research Society, Symposium held Nov. 26-22 1990 Boston, Ma.

*Primary Examiner*—Patrick J. Ryan
*Assistant Examiner*—William A. Krynski
*Attorney, Agent, or Firm*—Robin D. Goldstein

[57] ABSTRACT

The invention discloses an improved structural glass composition and process for manufacture. In one embodiment in which the improved structural glass may be used in isolation, the glass comprises a foamed glass core which is manufactured by supplying a glass base through which a gas is infused, either by reaction or by entrapment. As the gas to glass ratio is increased to an optimum level, the quality of the foamed glass moves from a stiff homogeneous glass which is strong in compression, weak in compression and brittle, to a foamed glass which is strong in compression, weak in tension and ductile. In a second embodiment of the invention inorganic fibers supported by a glass matrix may be wrapped around the foamed glass core. This fibrous material is generally strong in tension and also ductile. The resultant combination is a glass structure which is both strong in compression and strong in tension and which is ductile. It is anticipated that the improved glass composition may be used in place of or in combination with traditional steel, concrete, wood, aluminum or other building materials, and may provide the added benefits of lower embodied energy, better thermal and acoustical insulation and increased protection against the elements, as well as being fire resistant.

14 Claims, 14 Drawing Sheets

PRODUCTION OF TENSILE MATERIAL BY DEFORMATION OF THE GLASS FOAM

UNIFORM DEFORMATION

INCREASING DEFORMATION

FIGURE 3
GLASS FOAM
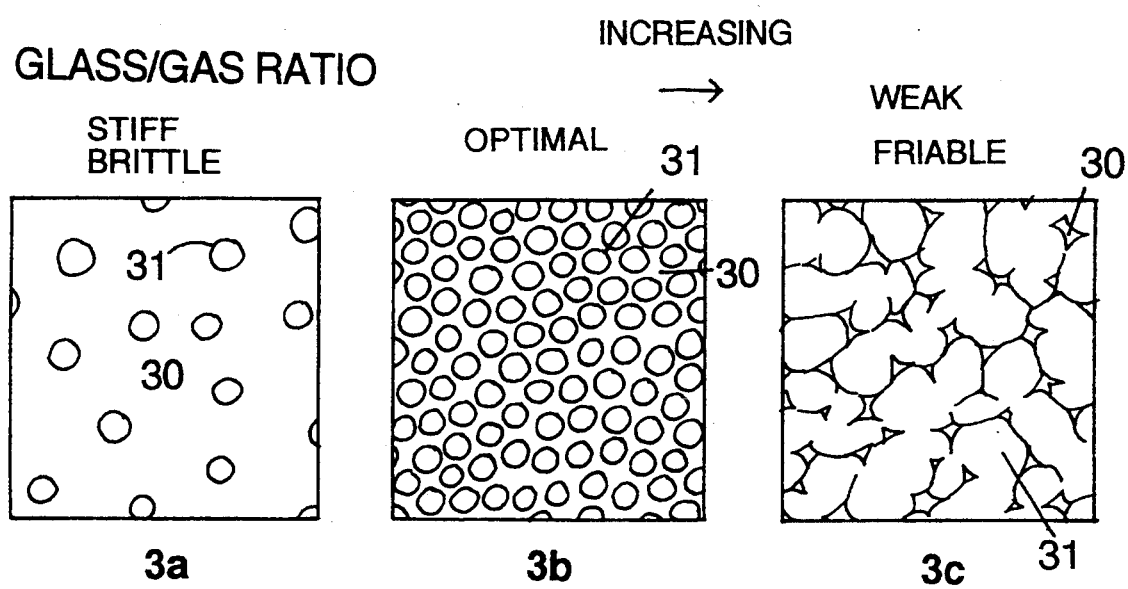
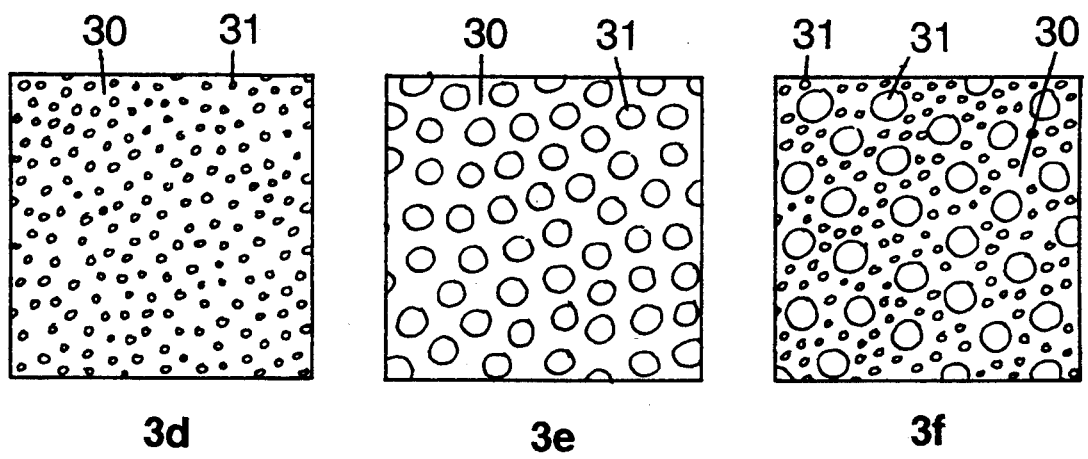

PRODUCTION OF TENSILE MATERIAL BY DEFORMATION OF THE GLASS FOAM

UNIFORM DEFORMATION

INCREASING DEFORMATION

DIFFERENTIAL DEFORMATION

MANUFACTURING PROCESS IF COMPOSITED FROM SEPARATE FOAM AND FIBER COMPONENTS

AXIAL COMPRESSION UNIT

SIMPLE BEAM UNIT UNDER CONTINUOUS LOAD

FIGURE 10  CLADDING UNITS
PAVING UNITS

CLADDING

PAVING

STRUCTURAL GLASS

This is a continuation of application Ser. No. 08/030,668, filed Mar. 12, 1993, now abandoned.

This invention relates, generally, to the field of construction and building materials and, more particularly, to the novel application of glass as a structural material for use in architecture and other fields.

BACKGROUND OF THE INVENTION

In the field of architecture, and the associated fields of building materials and construction techniques, there has developed through the years a certain attitude towards design which is, in part, based upon the limitations associated with the particular building materials available. Steel, brick, steel reinforced concrete and wood are commonly used today for their structural integrity and, because their structural qualities are well known, it is also known that buildings which are constructed from steel, brick, steel reinforced concrete and wood all suffer from similar limitations. Some of these limitations include that fact that the production of buildings from traditional construction materials is energy intensive, especially when considering the total energy cost which may be assigned to a building beginning with the manufacture of the building material through the ongoing energy costs associated with the operation of the building. In addition, traditional construction materials are often wasteful of energy in their manufacture, have a high static load and are frequently in need of continuous protection from the elements, both before and after their inclusion into a finished structure. These elements may be natural or man-made and include fire, thermal and acoustical conductivity and corrosion.

Because of these limitations, classes of alternative building materials have been developed which attempt to address the concerns of both architects and construction engineers alike. However, of the materials commonly available to the architect for construction, glass as a building material has apparently, and unnecessarily, been limited in terms of its application. This may be due in part to its relatively complex physical and chemical behavior and also to the fact that glass is actually a family of materials rather than a single "conventionally understood" material, such as aluminum. In addition, historically glass has been associated almost synonymously with architectural transparency and light control so much so that its structural and behavioral properties have been subordinated in favor of these optical qualities. In the past when glass was treated as an element with structural integrity, dependency on supporting armatures of other materials was usually involved. This limited view of glass was exacerbated by the well understood brittle characteristics of homogeneous glasses.

By way of example, assemblies made of plate glass sheets partly supported by steel cable tension elements and steel or alloy bar compression elements have been used in the past to form a type of space frame. In addition, there have been examples of plates of sheet glass being bolted and glued together to produce fenestration assemblies of plate glass "lights" with plate glass fins which could support their own loads. Further examples include the 19th century "Glasshouses" in which wood, iron and steel were the structural load bearing components. However, only recently has glass actually been used as a load bearing material in construction. One such example are the designs from the 1930's by Guissepi Terragni in which glass was conceived as structural. Terragni's "Danteum" depicts transparent glass columns, although no technical or theoretical discussion of these glass elements accompanied this design. In addition, it appears that these designs were never, in fact, built.

Therefore it has been determined that the need exists for an improved building material which may be used to overcome the limitations of conventional building materials by having lighter structural elements, having a lower embodied energy, having a lower thermal conductivity, having a lower acoustical conductivity, having a higher resistance to corrosion, and by being economical to manufacture and use. Accordingly a composite architectural component has been developed using fiber reinforced and foamed glass to impart structural strength and to increase construction and form versatility.

SUMMARY OF THE INVENTION

This invention is directed to a new architectural and construction material which is glass based and which relies on the unique physical properties of glass, as opposed to its light transmissive qualities. The new glass material has an internal heterogeneity and is designed to anticipate and respond to stress fields at architectural proportions, resulting in a lightweight, strong and inexpensive construction material which may be used in place, or in cooperation with, steel, concrete aluminum and masonry.

In one embodiment the new glass material is a composite made up of a tensile component, preferably inorganic fibers supported in a glass matrix, and a compressive component, preferably foamed isotropic glass. In a second embodiment the new glass material is made up of only a compressive component, such as foamed isotropic glass. The new glass material may supplement or replace existing beam and column systems, cantilever structures, torsion structures, building envelopes, cladding units and masonry units. The new glass material may also be applied to the construction of airplane substructures, boat hulls, and general engineering and product design.

In practice the new glass building material is based on research which indicates that: (a) Homogeneous glasses are strong in compression, weak in tension and brittle; (b) Foamed glasses are strong in compression, weak in tension and somewhat ductile; and (c) Inorganic fibers (such as glass fibers) supported by a glass matrix can be strong in tension and somewhat ductile.

The result is that combining homogeneous glass with fibrous material (whether glass or not) results in a glass building material which combines the strong compressive qualities of glass with the strong tensile qualities of an inorganic fiber to produce a light, energy efficient, structurally versatile building material.

In one example a composite glass building material produced in accordance with the invention may be manufactured by starting with a foamed glass produced by a chemical reaction or by gas entrapment. This foamed glass is then placed into a high temperature mold by either injection or molding. In the mold the underlying glass substructure is formed into the desired shape. The molded foamed glass substructure is then cooled and removed from the mold.

At the same time that the foamed glass substructure is being produced, inorganic fibers produced at high temperature are combined with a matrix material produced at a moderate temperature. This combination then produces a fiber-matrix sheath which may be produced at an overall moderate temperature.

Once the molded glass substructure and fiber-matrix sheath are produced, the two elements are combined. At this point the foamed glass core is either maintained at a moderate temperature or reheated in order to fuse the outer fiber-matrix sheath to the foamed glass core. This new structure is then cooled and removed from the second molding process resulting in a composite foamed glass core structure surrounded by an inorganic fiber and matrix sheath (both of which may also be comprised of glass).

In another embodiment the structural glass of the invention may be formed through a process in which no separate fiber or matrix is used. Rather, as in the first example, a foamed glass is produced either by reaction or by gas entrapment. This foamed glass is then placed into a high temperature mold and then changes shape (preferably under computer control) so that the extended vesicles, or "bubbles" trapped within the foam, are stretched and compressed to form a tensile material. This molded foam is then cooled and removed resulting in a heterogenous material comprised of single glass foam which has been manipulated in order to create both a compressively strong and a tensely strong building material.

Accordingly, it is an object of the invention to provide a structural glass material which is strong in both compression and tension, depending on the induced stress field, and which exhibits the ductility and failure characteristics necessary for construction purposes.

It is another object of the invention to provide a structural glass material which is lighter than existing structural materials.

It is an additional object of the invention to provide a structural glass material which has a lower embodied energy than traditional building materials.

It is a further object of the invention to provide a structural glass material which exhibits low thermal conductivity as well as a high resistance to corrosion.

It is even another object of the invention to provide a structural glass material which high acoustic isolation.

It is yet an additional object of the invention to provide a structural glass material which is fire resistant.

It is yet another object of the invention to provide a structural glass material which may free construction methods from conventional thought.

It is yet a further object of the invention to provide a structural glass material which may permit alternative aesthetics in construction materiality.

It is still another object of the invention to provide a structural glass material which may be used as a replacement, alternative or adjunct in the construction of masonry units, beam units, column units, cantilever units, cladding units, truss units, shell units and combination units.

It is still a further object of the invention to provide a structural glass material which may fail in a non-catastrophic manner.

Still other objects and advantages of the invention will, in part, be obvious and will, in part, be apparent from the specification.

The invention accordingly comprises the features of construction, combinations of elements and arrangements of parts which will be exemplified in the detailed descriptions hereinafter set forth, while the scope of the invention will be indicated in the claims.

BRIEF DESCRIPTION OF THE DRAWINGS

For a fuller understanding of the invention, reference is had to the following descriptions taken in connection with the accompanying drawings in which:

FIGS. 3 are simplified illustrations of the ratio of glass to gas and related bubble diameter at a constant gas to glass ratio;

DETAILED DESCRIPTION OF THE PREFERRED EMBODIMENTS

Figure 1:
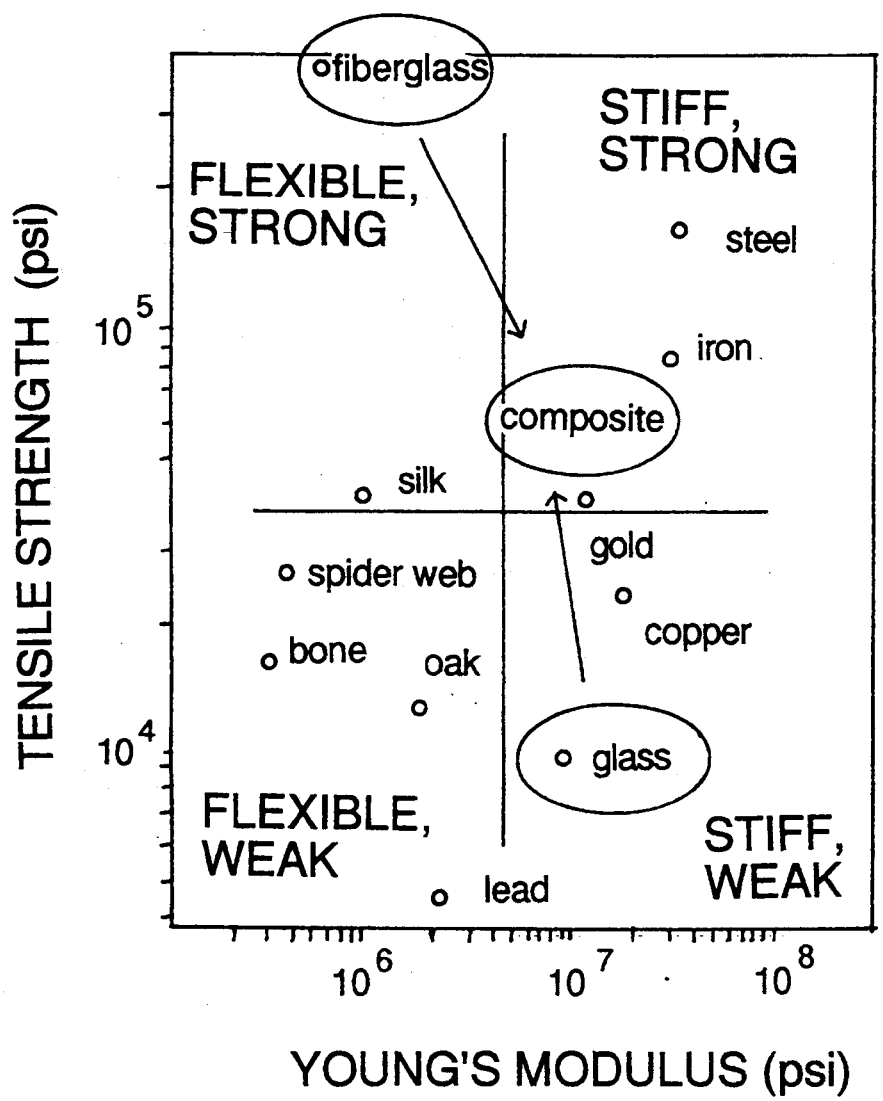
FIG. 1 is a simplified graph illustrating tensile strength in comparison to Youngs Modulus for common materials.

Historically, glass has been viewed as virtually synonymous with architectural transparency and light control. Its structural properties and behavioral qualities have most often been subordinated in favor of these optical qualities. Therefore, this invention take advantage of the less employed physical properties of glass as a material in order to develop a superior architectural and structural element.

One significant factor in the development of this new structural glass is an attempt to reduce the overall energy required for design and construction. Generally speaking, the amount of energy expended in the production of most architectural materials, and the amount of energy lost to the environment through them, are primary concerns. It is anticipated that the production of structural glass may be lower than for equivalent amounts of steel, steel reinforced concrete and aluminum. Certainly information on the embodied energy of common building products highlights the enormous "thermal-cost" of construction steel, lime and portland cement. Additionally, it is well known that the production of aluminum is so energy intensive that most aluminum production facilities operate using electricity sold at a fraction of the cost borne by other users. Other products, such as laminated wood used for small superstructural applications, also have relatively high embodied energy costs due to the use of polymer resin and plastic adhesives derived from energy intensive oil production, acquisition and treatment, even before the assembly process has begun.

Another significant factor in the development of this new structural glass is that both the thermal and acoustical conductivity is relatively low. This is advantageous in terms of reducing the number of components which have to be included in a construction assembly which must also mediate between high and low temperature environments. By using the teachings of the invention it is possible to simplify the design of building envelopes in both cold and temperate climates. The effect of "cold-bridging" across structural elements can be significantly reduced without the use of complicated, construction and labor intensive insulation systems. The acoustical analog of reduced "sound-bridging" operates in a similar manner. One effect of low thermal conductivity is increased fire resistance. An additional beneficial effect of low thermal conductivity is higher resistance to weathering corrosion and the degradation of the structure, especially in comparison to materials such as steel or glass reinforced plastic, both of which have to be protected by additional structure if they are to remain intact.

A third significant factor in the development of this new structural glass is not connected with energy efficiency, but rather with the fundamental premises upon which the design of buildings and spaces is based. The use of composite structural glass in architectural design will suggest and permit alternative understandings of construction logic, and possibly even an alternative approach to aesthetics in architecture as well as the potential for the questioning of conventional thought on construction logic. As noted above there appears to be an almost pan-cultural association of glass with transparency, light and brittleness. Even the way that words pertaining to glass have been appropriated and absorbed into the language betrays this. Nevertheless, there also appears to be a more sublimated, vestigial understanding of glass as a substance of extreme versatility, and sometimes of strength and resilience. Never the less, this "secondary" set of characteristics has remained subordinate to the light transmissive qualities of glass. Consider the Corning Glass cookware products which are advertised as being almost as resistant to wear and tear as their metal counterparts. Many people don't think of glass fibers as being the same substance, and yet glass can have enormous tensile strength. For example, the tensile strength of mild steel is 370–700 mega-newtons per meter squared, while the tensile strength of E-glass fibers are almost 10 times that at 3500 mega-newtons per meter squared. In fact, the physical properties of glass vary widely depending on, among other factors, its scaler/spatial configuration. Put another way, a very small piece of glass does not perform the same way as a very large piece of glass of a different shape. These physical properties also depend on the way the piece of glass is manufactured, and particularly whether stress fields exist within it and, if so, their orientation. As will be discussed more fully below, the key to manipulating glass and its physical characteristics is to modify its scaler/spatial configuration. One way to do this is to place gas bubbles (vesicles) within it; that is, to "foam" it. This changes its properties profoundly. By foaming glass it may then be thought of like a large number of tiny arcuate elements joined together around spherical spaces. In an analogous sense, this is the conceptual inverse of, for example, concrete. Very large, perfect, inorganic crystals of exactly the same composition as concrete would perform badly under architectural stresses, and yet the glass of the present invention performs well.

The final significant factor in the development of structural glass is the ability to provide a major construction material which has very low relative density; which may be potentially as low as 1.0, or even lower. Such a material would be extremely useful in instances where a relatively small dead-load is preferred. Certainly, if composed largely or completely of foamed glass, the dead load of a building material could be remarkably small without loss of strength.

Therefore it is at the core of the present invention the premises that:

1) Homogeneous glasses are strong in compression, weak in tension and brittle;

2) Foamed glasses are strong in compression, weak in tension and somewhat ductile; and 3) Inorganic fibers supported by a glass matrix may be strong in tension and somewhat ductile.

Combining these properties, a structural foamed glass and/or foam/fiber composite building material may then be developed in order to maximize the use of those divergent properties of glass and fibrous substances that circumvent the intuitively problematic connotations of ordinary homogeneous glass. In another sense, it is the very fact of difference that allows the composite to function. Relatively expeditious design of a structural element could include the placement of fibrous sheaths around, or in fixed contact with, cast foamed glass cores and armatures. Strictly speaking, the foamed material will not all be in pure compression, and the fibrous material will not all be in pure tension. Never the less, the resultant understanding is accurate for the purposes of developing new materials based upon the invention.

Turning, then, to FIG. 1 a simplified graph illustrating tensile strength in comparison with the Youngs Modulus for common materials including bone, glass and fiberglass is shown. Ductility and strength fields within this diagram characterize a material's tendency to perform well or badly under architectural stress conditions. Those materials falling within the stiff/strong field are most likely to perform well as structural materials. As can be seen, although neither glass nor fiberglass fall within this field, a composite containing both and constructed in accordance with the teachings of the instant invention could do so, if appropriately configured. This combination of fibrous and foamed material is central to the instant invention.

Figure 2:
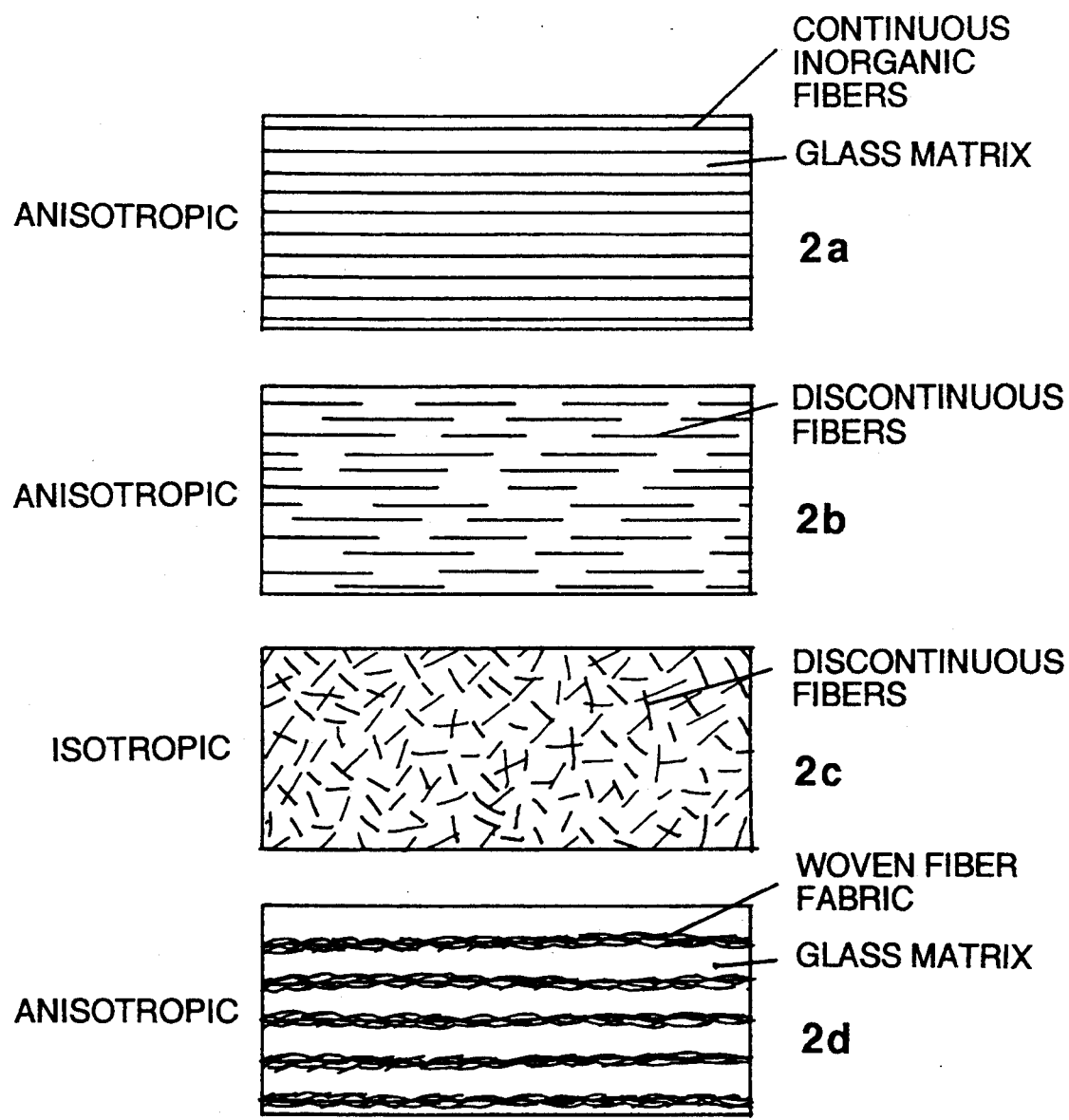
FIGS. 2 are illustrations of some potential fiber configurations used in glass fiber reinforced plastics and which may be also used in accordance with the instant invention.

Referring, then, to FIG. 2, a review of the construction of the fibrous component will first be discussed. As can be seen, FIG. 2 illustrates some potential fiber configuration options used in glass fiber reinforced plastics and which may also be used in accordance with the instant invention. The lengths of fibers, their orientation, and the ratio of matrix to fiber volume may be varied to adjust tensile and shear strength properties. A high degree of parallelism increases tensile strength in that direction, while a low degree of parallelism may significantly increase compressive strength. FIG. 2a illustrates an anisotropic construction where continuous inorganic fibers are surrounded by a glass matrix. FIG. 2b illustrates a second anisotropic construction where discontinuous fibers are embedded in a glass matrix. FIG. 2c illustrates an isotropic construction where discontinuous fibers are arranged with a low degree of parallelism, increasing compressive strength. FIG. 2d illustrates an alternate anisotropic construction where continuous inorganic fibers are replaced with a woven fiber fabric combined with a glass matrix. Each of these options provides a differing degree of parallelism and, subsequently, different mixtures between the tensile and shear strength of the resulting material.

One important factor in the physical properties of the resulting composite is the elasticity modulus contrast between matrix and fiber. It is important that the matrix have a lower modulus of elasticity than the fibers. This is in order to permit the fibers to carry the vast majority of the load, and to permit the matrix deform, often just slightly, around the fibers as the strain energy builds up, thus efficiently transferring the load rapidly across the whole of the fiber body. This theory has been well established in glass fiber reinforced plastics technology. However, the resulting fiberglass material, as seen in FIG. 1, may fall into the "flexible but strong" category, making it unsuitable for use in developing primary construction materials which may be used, for example, to replace steel.

Therefore the development of an appropriate fiber and matrix combination must factor in modulus properties. In addition, the thermal softening points of the matrix and fibers should also be different. The reason for this is that to embed the fibers within the glass matrix the matrix must be in a liquid state and the fibers still solid (or at least a super cooled fluid). Ideally, a high temperature, high elasticity modulus fiber should therefore be combined with a low temperature, low elasticity modulus matrix. High temperature fibers may include high temperature glass, boron, steel, pyroxene (an iron magnesium aluminosilicate), kaolin (an aluminum hydroxysilicate), and aluminum oxide, among others. Aluminum oxide fibers, for example, have enormous tensile strength; one hundred times the order of magnitude of mild steel.

Another factor to be considered is the extent to which the tensile strength of the fibers can be maintained at high temperature, or more especially, the melting point of the matrix. The melting temperature of the matrix must be lower than those temperature conditions at which a release of strength-inducing strain energy in the fibers will occur. In addition, the contrast in coefficient of thermal strain between the fibers, matrix, and the foam, must be low enough to prohibit thermal shock fracturing during the temperature swings of the manufacturing process.

Turning next to the foaming process, it is a key feature of the instant invention that foamed or heterogeneous glasses do not break in the same way as homogeneous glasses when struck, for example, with a hammer. Homogenous glass (or obsidian glass) fractures in a catastrophically brittle manner in which a positive feedback relationship between the applied force and the fracture propagation occurs. On the other hand, in foamed glasses (or vesicular glasses or pumice), a sharp blow from a hammer produces an absorptive crushing failure in which negative feedback impedes the progress of fractures and in some cases may prevent propagation altogether. Vesicular glasses dent rather than smash.

Experiments have been carried out using a small, electrically powered, computer controlled glass kiln. In these experiments ground glass is mixed with water and soda ash (containing sodium carbonate) at room temperature. This mixture is then placed in molds. These molds are made by forming a soft clay positive around which a refractory plaster is cast. The soft clay positive is then removed leaving a negative void of the desired shape into which the glass/soda ash mixture is placed. The refractory plaster is made by combining refractory sand and molding plaster in a ratio of approximately 1:1 by volume. Steel wire reinforcement may also be used where necessary. After the hardened molds have been filled with the glass mixture they are placed in the kiln and a carefully controlled heating and cooling cycle is programmed into and run by the kiln computer to a maximum temperature of about 1600 degrees F. In the initial experiments four different types of commercially available glasses were used: Lenox, Spruce Pine, Low Flux, and Gabbert (recycled bottle). several well-formed low-density glass foams were produced with gas to glass ratios of the order of approximately 7:3. The molds were then broken and the cast glass foam objects removed. Several different shapes were made including cylinders for compression testing and beam-like elements.

Although the process for developing glass foam outlined above results in the desired glass foam body, it may not be the best process for every manufacture. First, the process produces an excess of sodium in the finished product, which may attack the glass, leading to hastened devitrification. Other metal carbonates can be used, but if so, an essentially useless metal oxide or hydroxide by-product is almost always produced. More importantly, though, using the above described process, it is quite difficult to control the size of the vesicles. In addition, there is an inherent inefficiency in a process which begins at room temperature, is run through a complex heating and cooling curve, and then is re-run all over again for each batch of cast objects. A much more efficient, and by-product free process is one in which a relatively inert gas such as argon, carbon dioxide, nitrogen, or common air, is bubbled in a highly controlled way into the liquid glass melt. A constantly renewing batch of foamed melt can then be injected into ready-heated molds which are then be subject to controlled cooling on a conveyor feed. In one variation, fibrous material may be added during the cooling process before softening is over, but after the fiber degrading temperatures have passed.

Turning next to FIG. 3, we can see that vesicle diameter in the foam is important to the ultimate structural glass, as is gas to glass ratio. As shown in FIG. 3a, if there is too little gas, the material behaves essentially in the same brittle way as ordinary homogeneous glass. As shown in FIG. 3c, if there is too much gas, the material is friable and weak. FIG. 3b shows an optimal ration of gas to glass for the purposes of the instant invention.

In addition to varying the ratio of gas to glass in the foamed glass, as can be seen in FIGS. 3d–3f, with a constant gas to glass ratio, variations of bubble diameter are also possible, affecting the tensile/compressive strength qualities of the resulting glass foam.

In the foams produced by reaction in the experiments described above, vesicle size varied from around 0.5 mm to 10.0 mm. In an initial compression test, carried out on a standard mechanical compression rig, a roughly cylindrical sample of foam approximately 50.0 mm in diameter and 50.0 mm deep developed a load of 750 LB before crushing failure began. It is important to note that the first crushing failure was followed by another load build-up to 700 LB followed by a second crushing failure, and so on cyclically with ever decreasing maxima and minima until the sample was completely destroyed. This is a highly desirable failure characteristic, since for safety reasons, structural materials must fail gradually, and give adequate warning of any impending loss of structural integrity. This declining cycle is a product of the large range in vesicle diameter and shape. This will tend to permit sudden local failures that never become global until all the material has either been compressed or spalled off. With a more controlled vesicle diameter, the failure mode would describe a similar overall trajectory, but without such marked oscillation in load development.

Figure 4A:
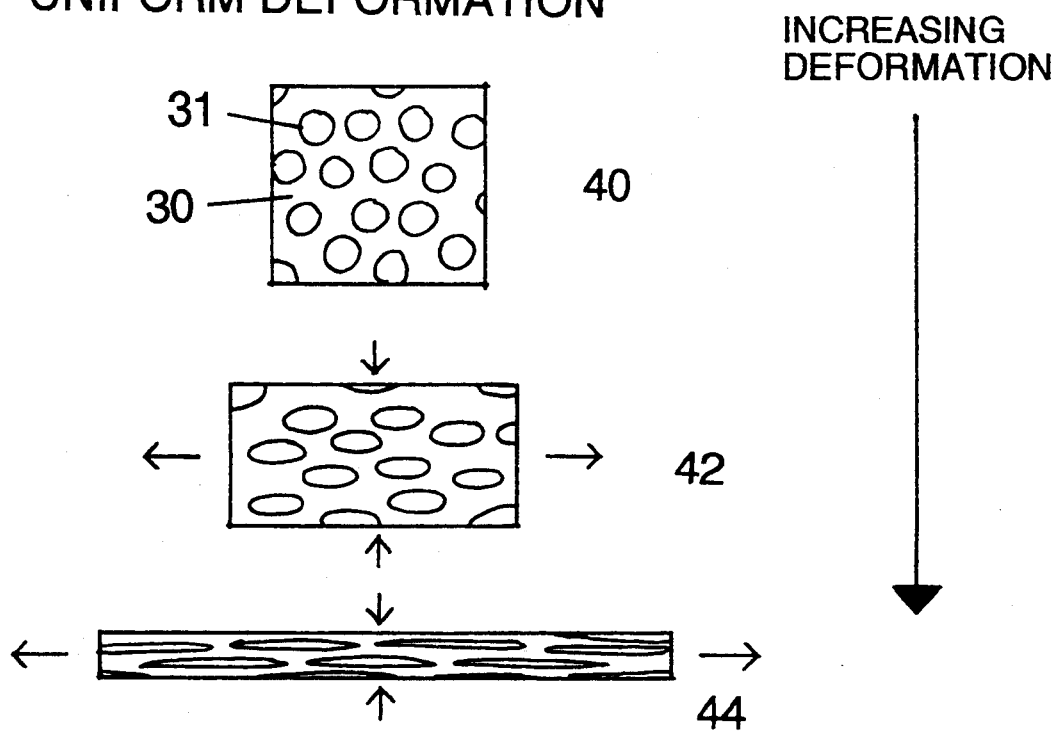
FIG. 4a is an illustration of the production of tensile material by the uniform deformation of glass foam.
Figure 4B:
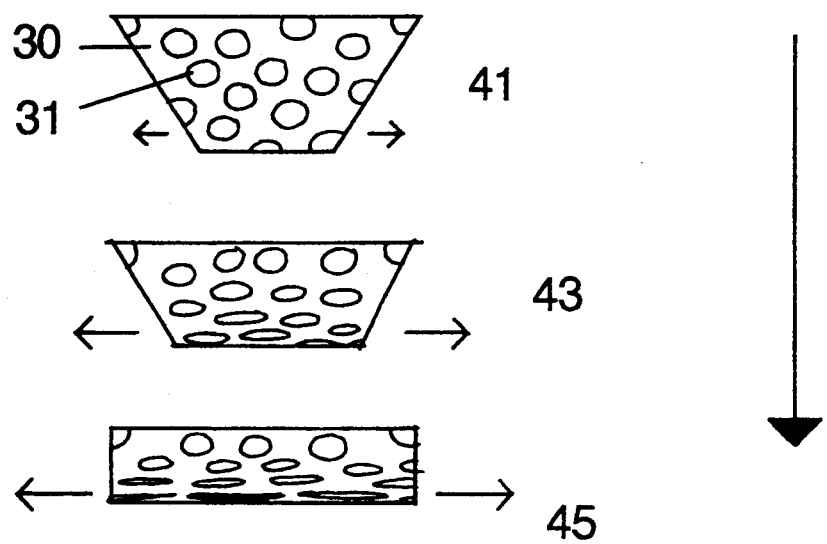
FIG. 4b is an illustration of the production of tensile material by the differential deformation of glass foam.

Turning next to FIG. 4a and 4b, two variations in the production of glass foam are shown wherein there is an active deformation of the foam while it is still in liquid form. This deformation may be controlled to produce a greater or lesser degree of anisotropy, or that is, to effect differences in the scaler/spatial or strain conditions within the same object. The potential advantage of such a construction would be to make it possible to manufacture a single object containing both tensile material and compressive material, in a single step.

Figure 5:
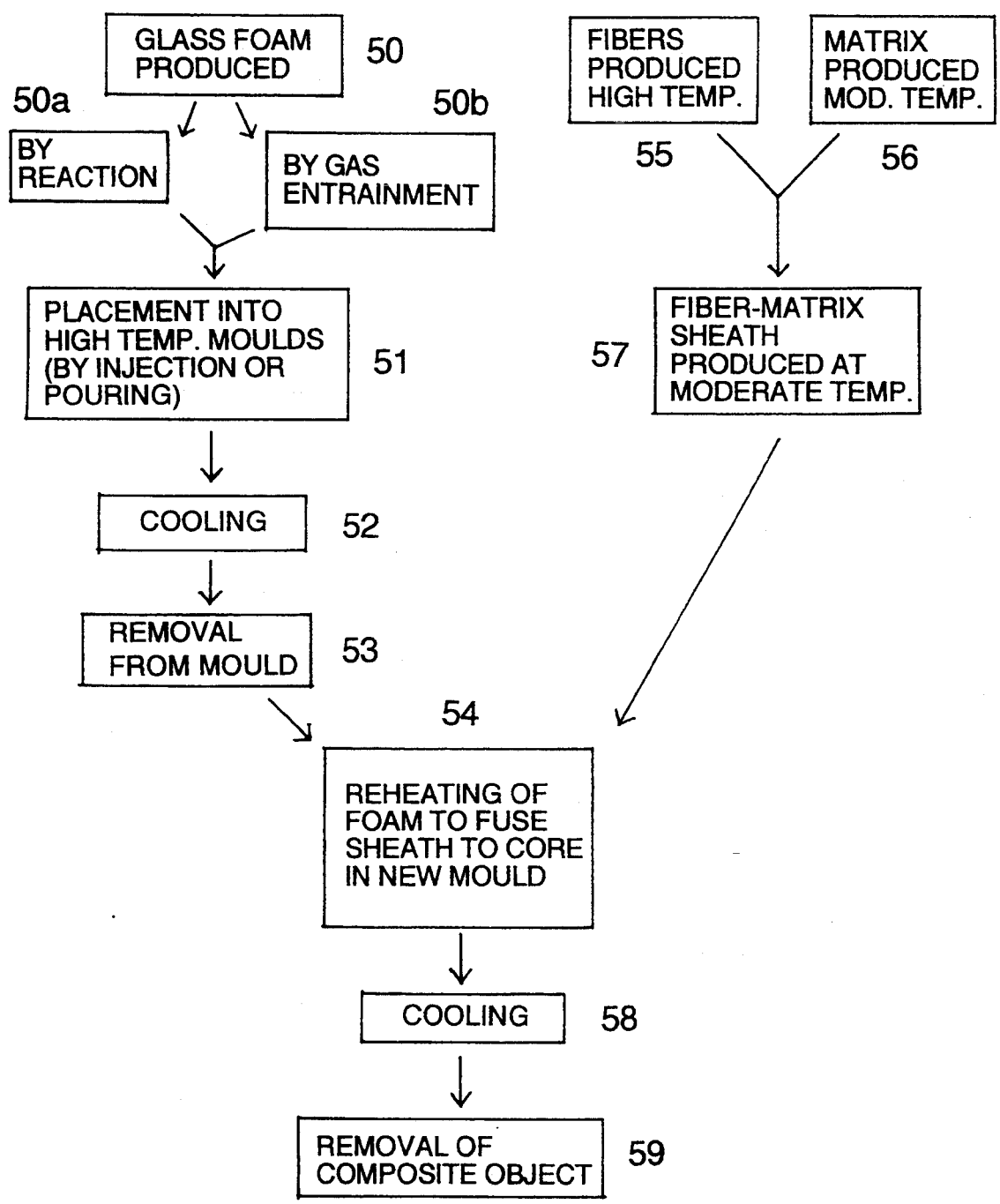
FIG. 5 is a flow chart depicting one embodiment of a process for the manufacture of structural glass in accordance with the instant invention.
Figure 6:
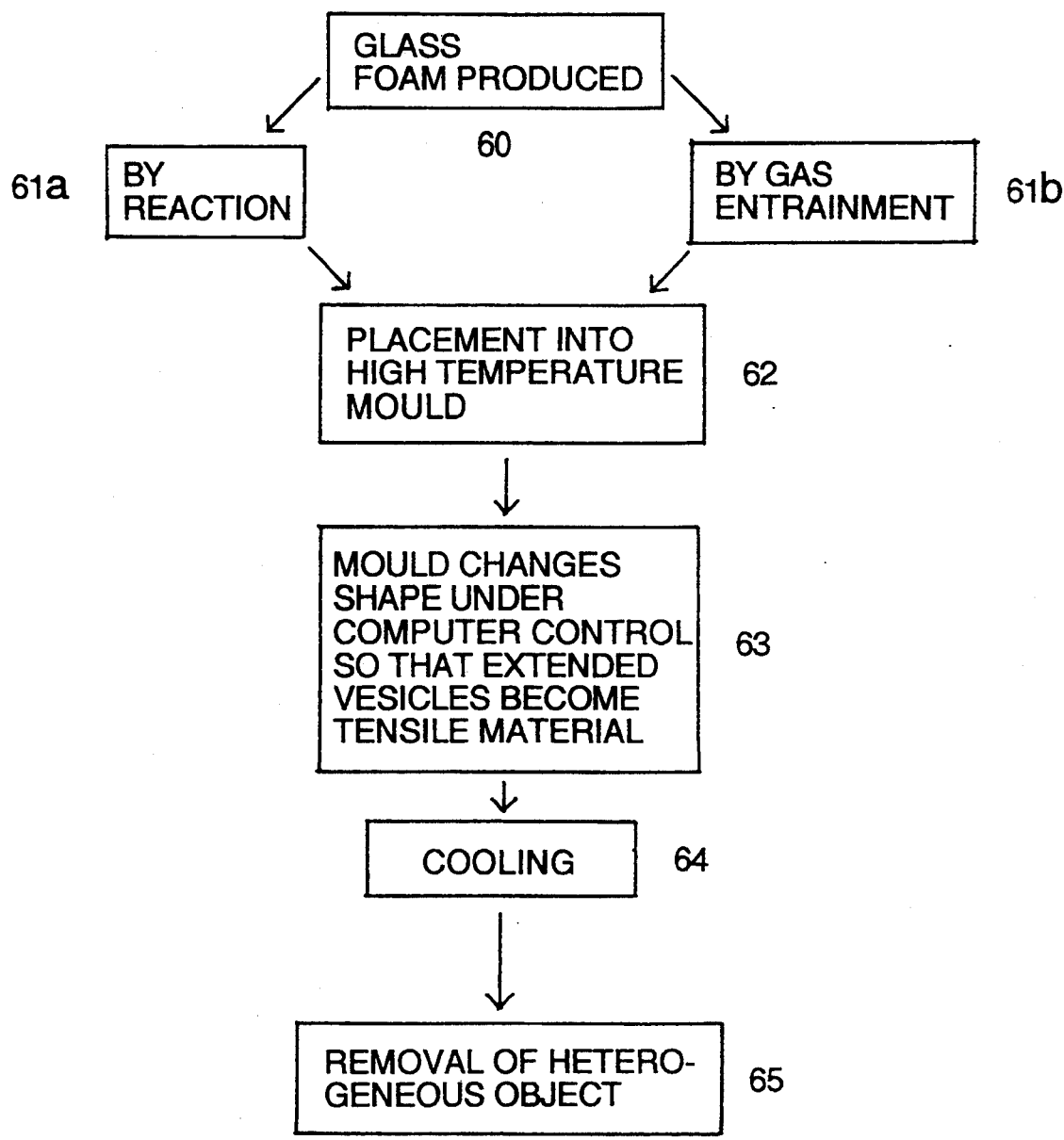
FIG. 6 is a flow chart depicting an additional embodiment of a process for the manufacture of structural glass in accordance with the instant invention.

A flowchart illustrating each of the above processes for manufacturing foamed glass is provided in FIG. 5 and FIG. 6, respectively. As shown in FIG. 5, a manufacturing process is provided for the production of composite structural glass foam from separate foam and fiber components. Starting with step 50, a glass foam is produced either by reaction 50a or by gas entrapment 50b. The foamed glass is then placed into a high temperature mold either by injection or by pouring at step 51. The mold is then cooled at step 52 and the molded foamed glass is removed from the mold at step 53. Simultaneously, fibers are produced at high temperature at step 55 while a matrix is prepared at a moderate temperature at step 56. These fiber and matrix materials are then combined at step 57 to produce a fiber-matrix sheath which is produced at moderate temperature. The fiber-matrix sheath is then combined with the molded foamed glass at step 54 and the foam is reheated in order to fuse the sheath to the core of the new mold. The new composite is then cooled at step 58 and removed from the manufacturing process at step 59 in order to arrive at a composite material in accordance with the invention.

Referring to FIG. 6, a process is described to produce a composite glass foam when the tensile component is produced by deformation of the glass foam. As illustrated, at step 60 a glass foam is produced. The foam portion is created either by a chemical reaction 61a or by gas entrapment 61b. The resulting glass foam is then placed into a high temperature mold at step 62. The mold then changes shape (preferably under computer control) at step 63 and is followed by a cooling phase at step 64. Finally, the heterogeneous foamed glass is removed at step 65.

Once the composite structural glass material is developed is may be cast molded into a variety of configurations. Elements similar or analogous to existing structural assembly types are probably simplest with which to illustrate the basic principles. The opportunity for far reaching innovation in construction logic is less obvious with these, but their implementation in a convention oriented building industry would also be more quickly facilitated.

Figure 7:
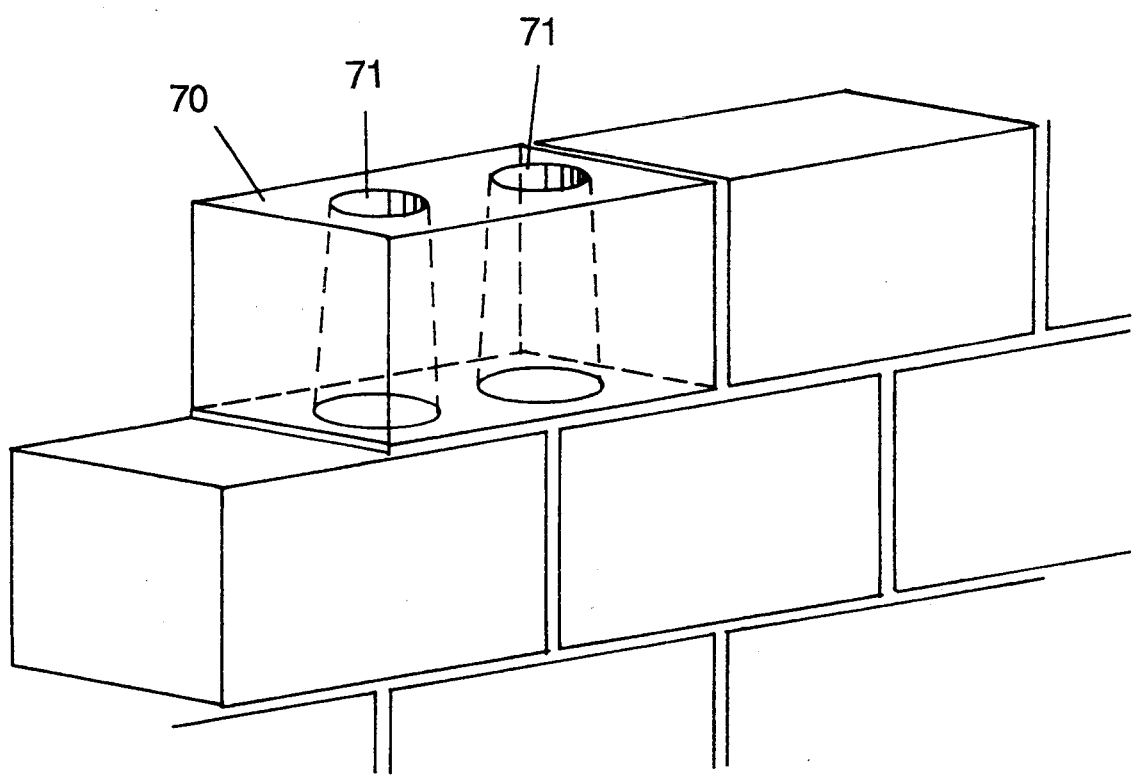
FIG. 7 is an illustration of a single masonry unit constructed in accordance with one embodiment of the instant invention.

The most conceptually simple element is the single masonry unit. Such a unit is illustrated in FIG. 7. Such a construction would not contain fibrous tensile material, and therefore would be the quickest, and perhaps least expensive to manufacture. The design would be essentially like that of a standard concrete masonry unit (CMU) 70 with cylindrical (but slightly conical) voids 71 to increase thermal insulation and further reduce dead-load. The voids could also be left out where loads are higher, or where the evenness of light transmission is an issue. These glass masonry units (GMU's) could be used to construct strong, lightweight, corrosion-resistant, masonry walls with extremely good thermal and acoustical insulation, and which could be made transparent, translucent or opaque. In cases where powerful percussion or point load damage is possible, it may be necessary to include fiber reinforcement near the skin of each GMU or to modify the gas to glass ratio.

Figure 8:
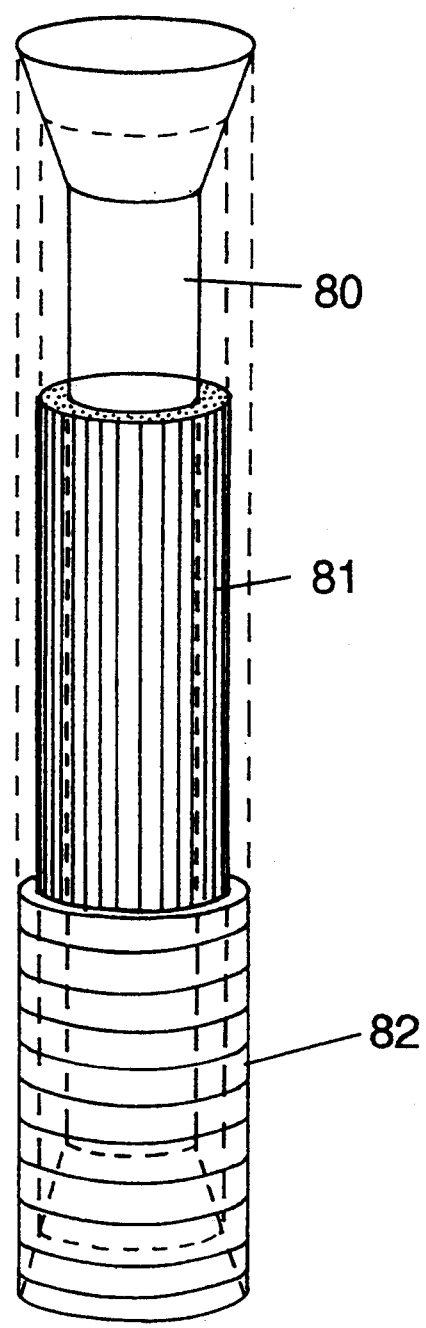
FIG. 8 is an illustration of an axial compression unit constructed in accordance with a second embodiment of the instant invention.

Another element which may be constructed in accordance with the teachings of the invention is a simple axial compression elements such as the unit illustrated in FIG. 8. Such a unit are composed of a core of foam 80 with a longitudinal fiber sheath 81, and circumferential fiber wrapping 82. The foam core 80 develops axial compression, the longitudinal sheath 81 develops buckling stresses, and the circumferential wrapping 82 develops lateral tension stresses. The widening of the foam at the ends makes the unit more stress bearing.

Figure 9:
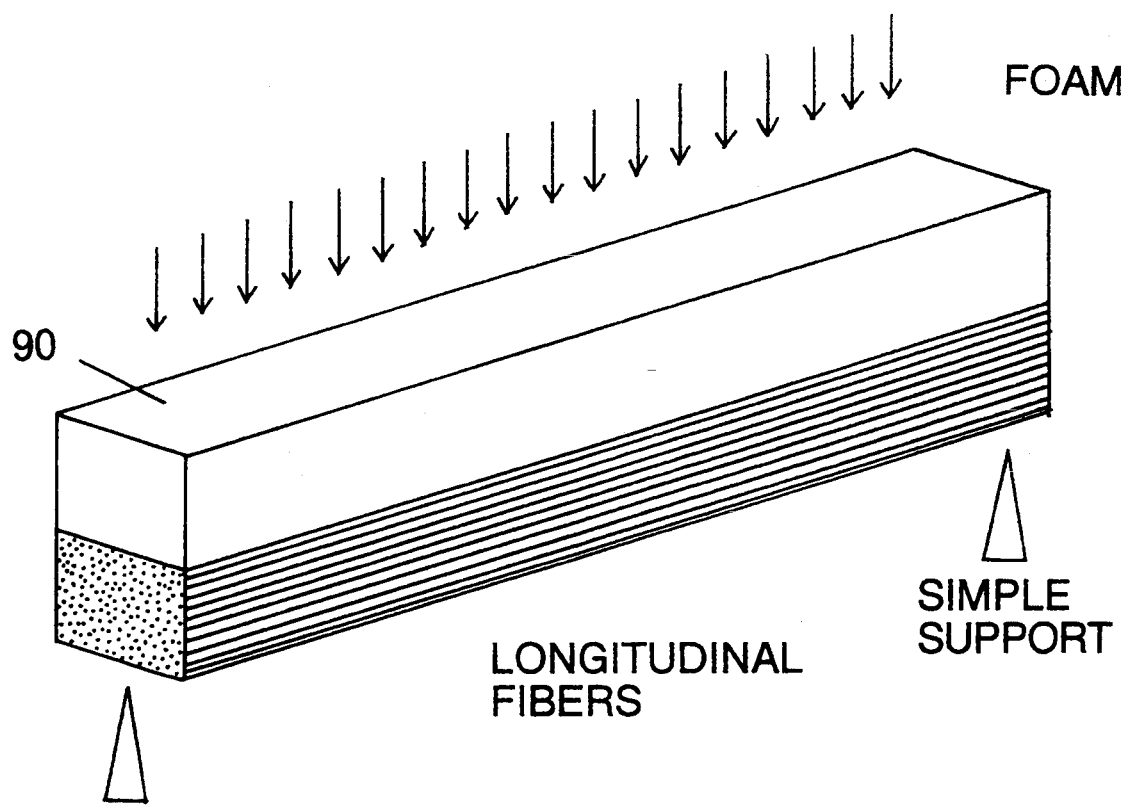
FIG. 9 is an illustration of a simplified beam unit constructed in accordance with the instant invention.
Figure 10A:
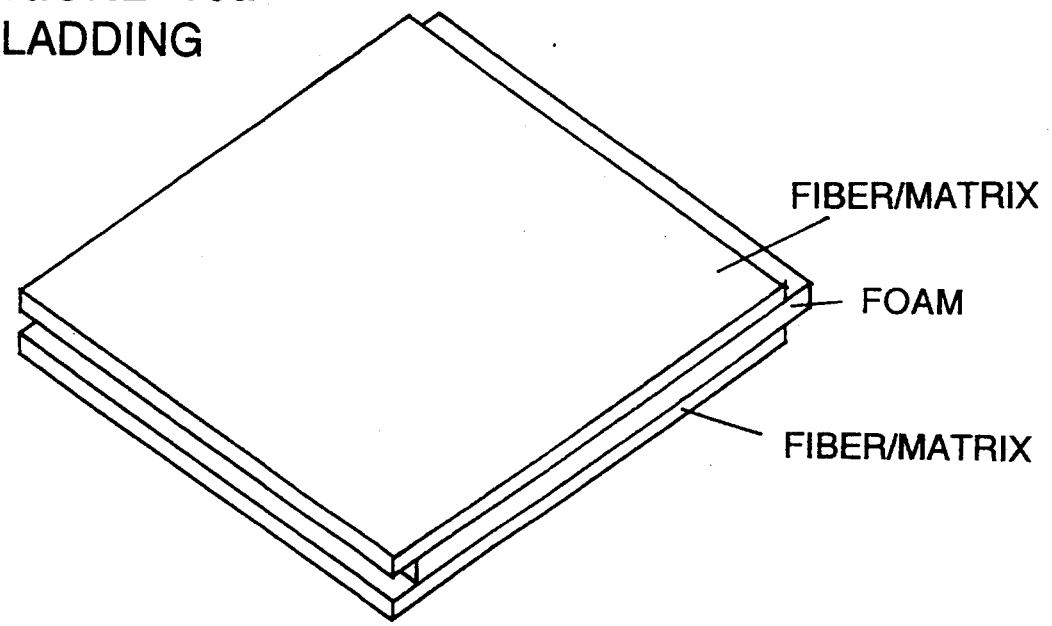
FIG. 10a is an illustration of a cladding unit made in accordance with the instant invention.
Figure 10B:
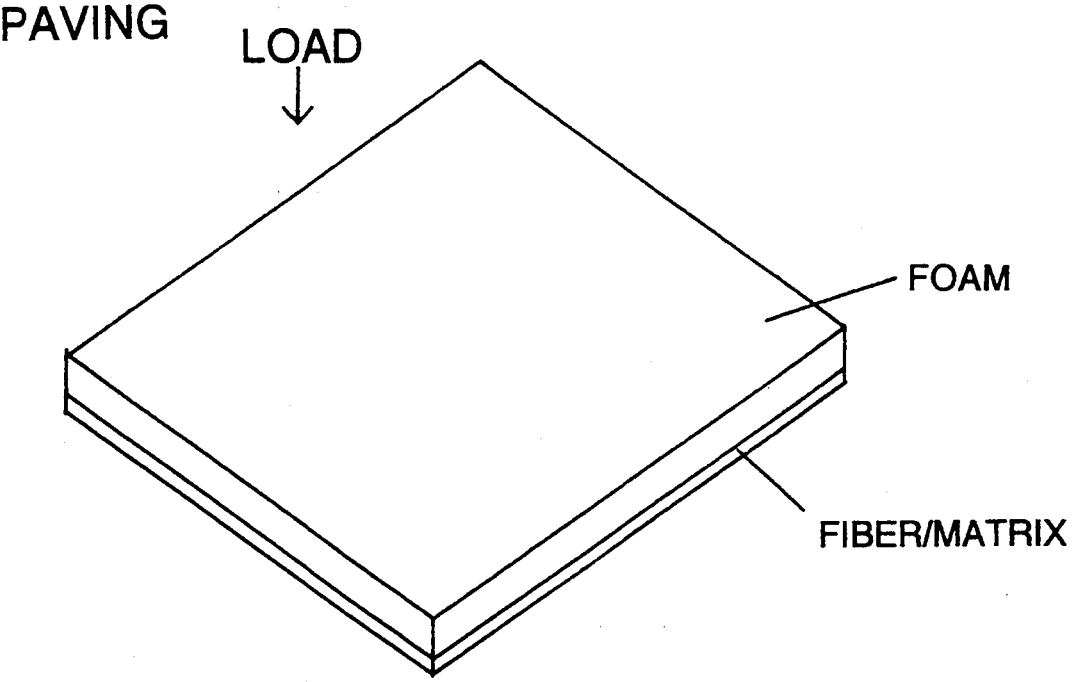
FIG. 10b is an illustration of a paving unit made in accordance with the instant invention.
Figure 11:
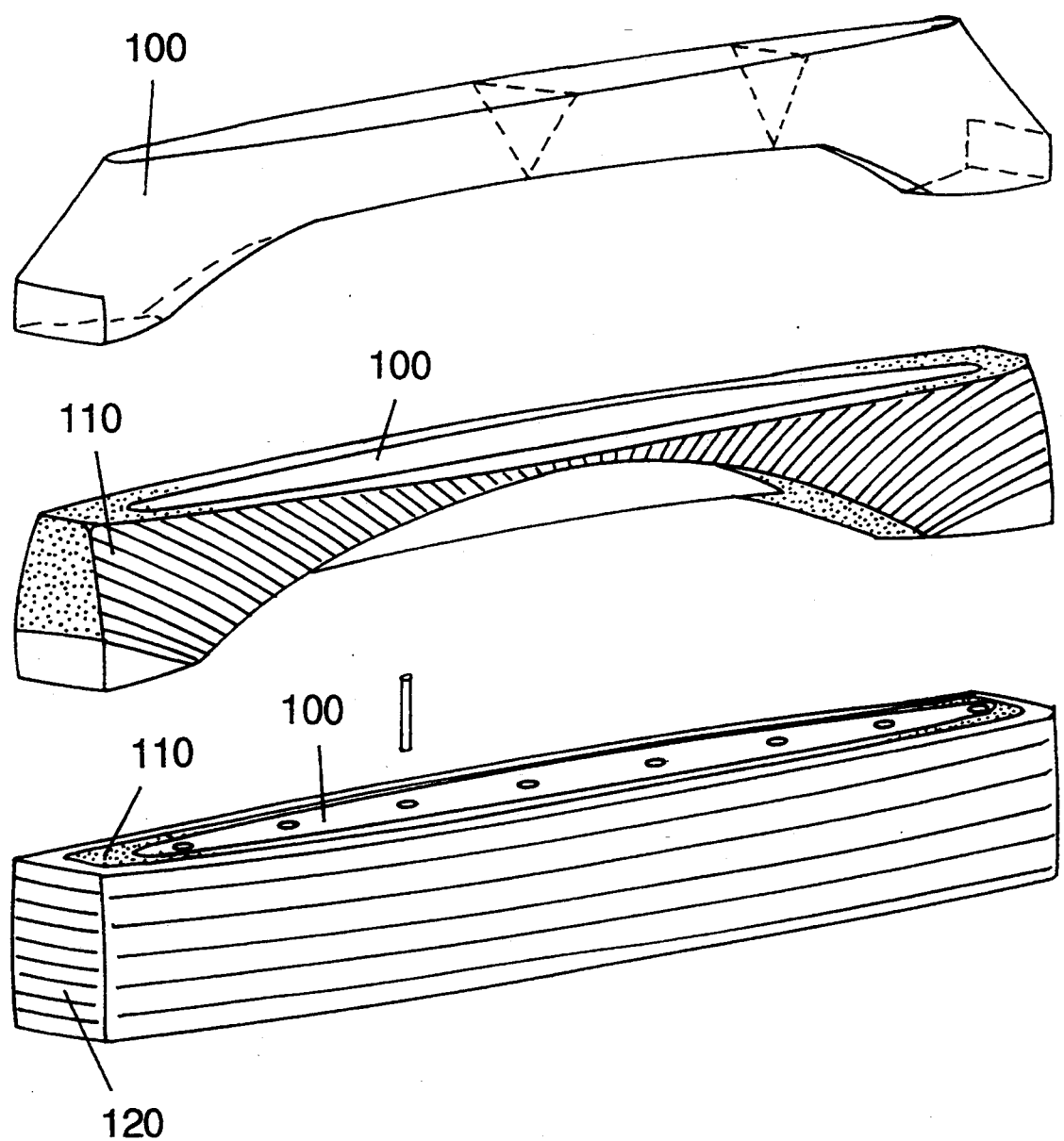
FIG. 11 is an illustration of a bending element constructed in accordance with the instant invention.

Turning to FIG. 9, a simple continuously or point loaded beam 90 is shown. The construction of this element is simplified to illustrate the essential juxtaposition of foam in compression, with fibrous material in tension, as the beam is subjected to bending. FIG. 10a and FIG. 10b illustrate Cladding and paving units made in basically slab-like form with tensile material on the sides most likely to experience tension in convex deflection;

FIG. 11, on the other hand, attempts to demonstrate how a bending element could be designed and manufactured using the composite of the invention to respond more efficiently to the internal stress conditions under a continuous load. At its core 100, is foam made in accordance with the invention. Wrapped near the ends of that are the fiber concentrations 110 aligned to resist shear failure. Finally around the whole assembly is a longitudinal tensile mass 120 concentrated on the underside. Bearing stresses near the ends are accommodated by thickened foam flanges.

Figure 12:
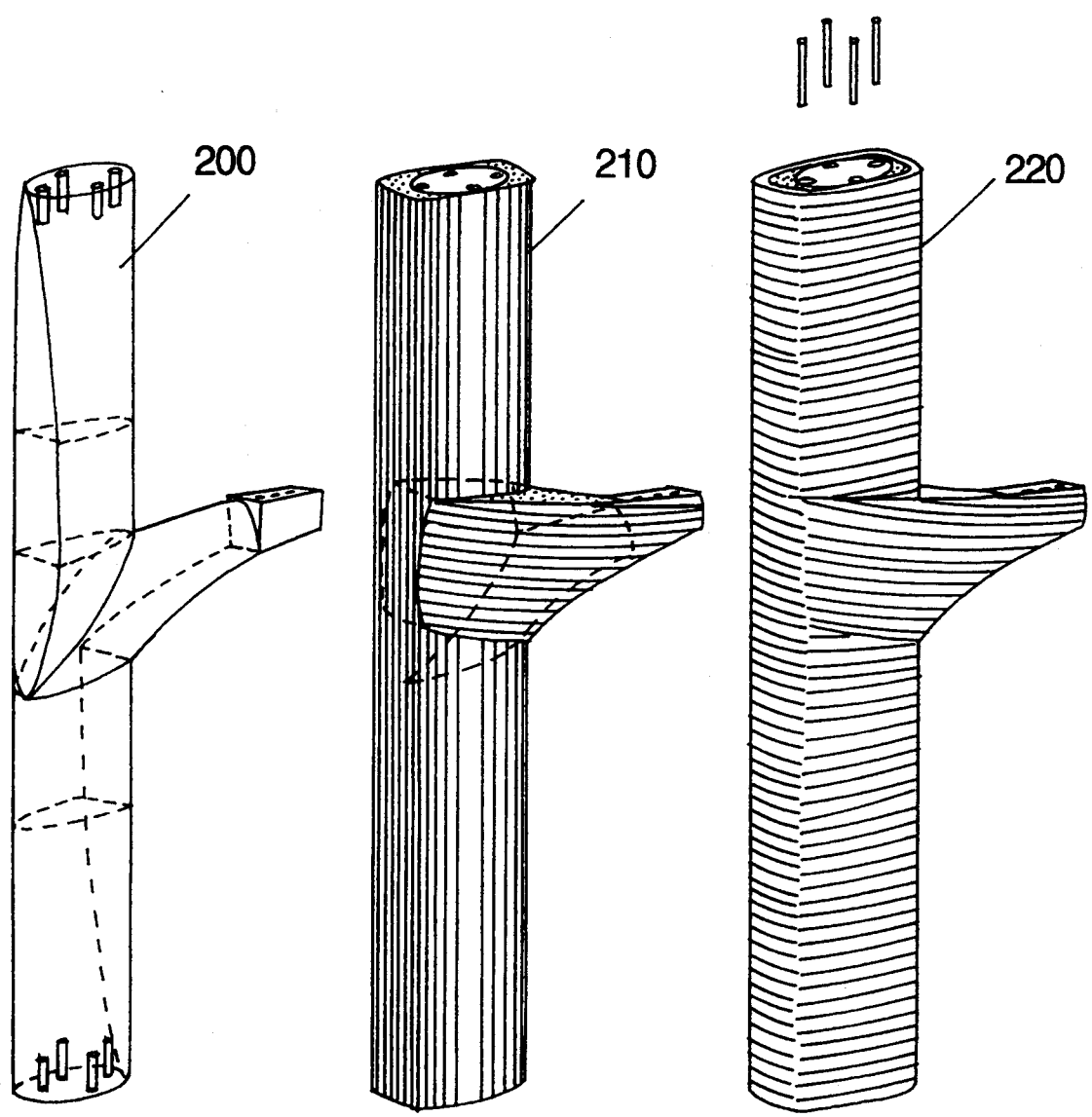
FIG. 12 is an illustration of the construction of a column and cantilever hybrid element constructed in accordance with the instant invention.
Figure 13:
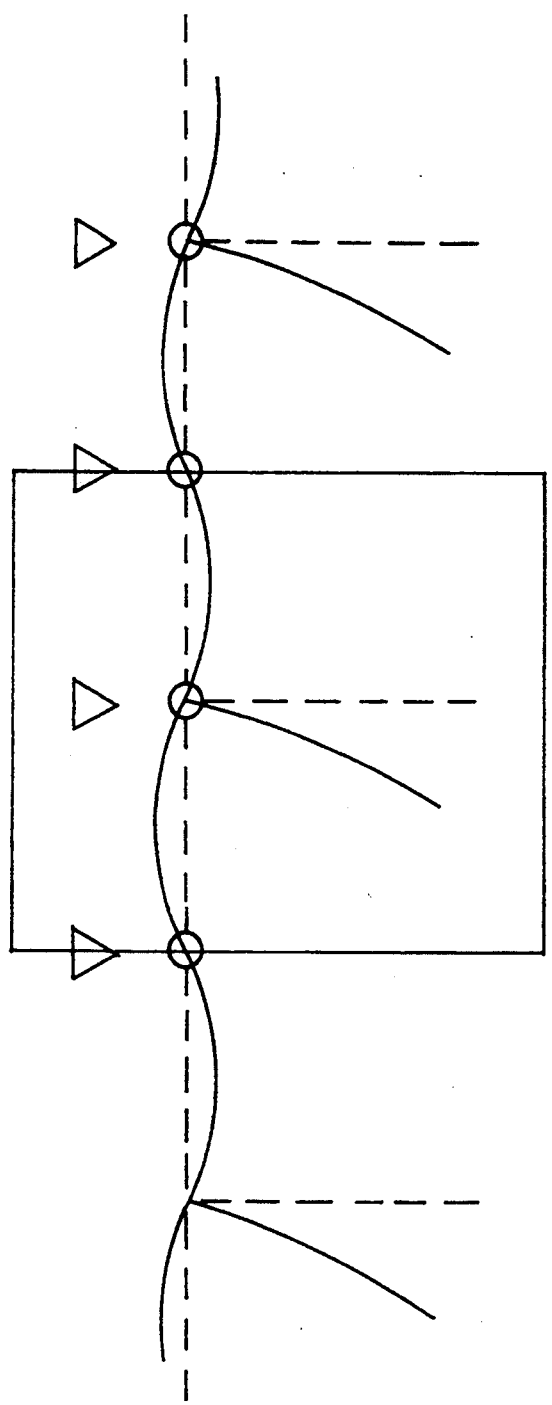
FIG. 13 is an illustration of a deflection pattern of the column shown in FIG. 12.

Moving to a more hybridized system, FIG. 12 similarly illustrates the construction of a generic column-with-cantilever element. Once again, foam 200 is placed as a pre-cast core with asymmetrical thickening along the vertical extent to respond to the sigmoidal deflection pattern that such a configuration would produce if serially stacked (FIG. 13), in a curtain wall structure for example. Longitudinal fibrous material 210 takes up the tensile component of the stress field resulting from this buckling tendency, and the cantilevered section's tensile field is also occupied by fibrous material. Finally, the circumferential fibers 220 perform the same operation as in the simple column element. As can be seen in FIG. 13, the extreme upper and lower ends are located at the points of inflection in the deflection pattern. At these points zero bending will occur, so the cross section can be symmetrical, and the fixing will be subjected to almost pure compression (with the exception of the outward component of the stress tensor which is accommodated by the circumferential fibers).

Fixing can be achieved in several ways, but perhaps one of the simplest is to cast in place thin tubular steel slots which will not produce local failure in the foam due to differential thermal strain, as would solid rods, as the foam cooled to become solid. Solid steel rods can then be slid in place on site to provide a connection that still allows for expansion and contraction of the whole assembly. Disassembly is then also be possible if required; otherwise, bonding in place is still an option. Bolting through preset holes, as in the case of pre-cast concrete is another option.

Figure 14:
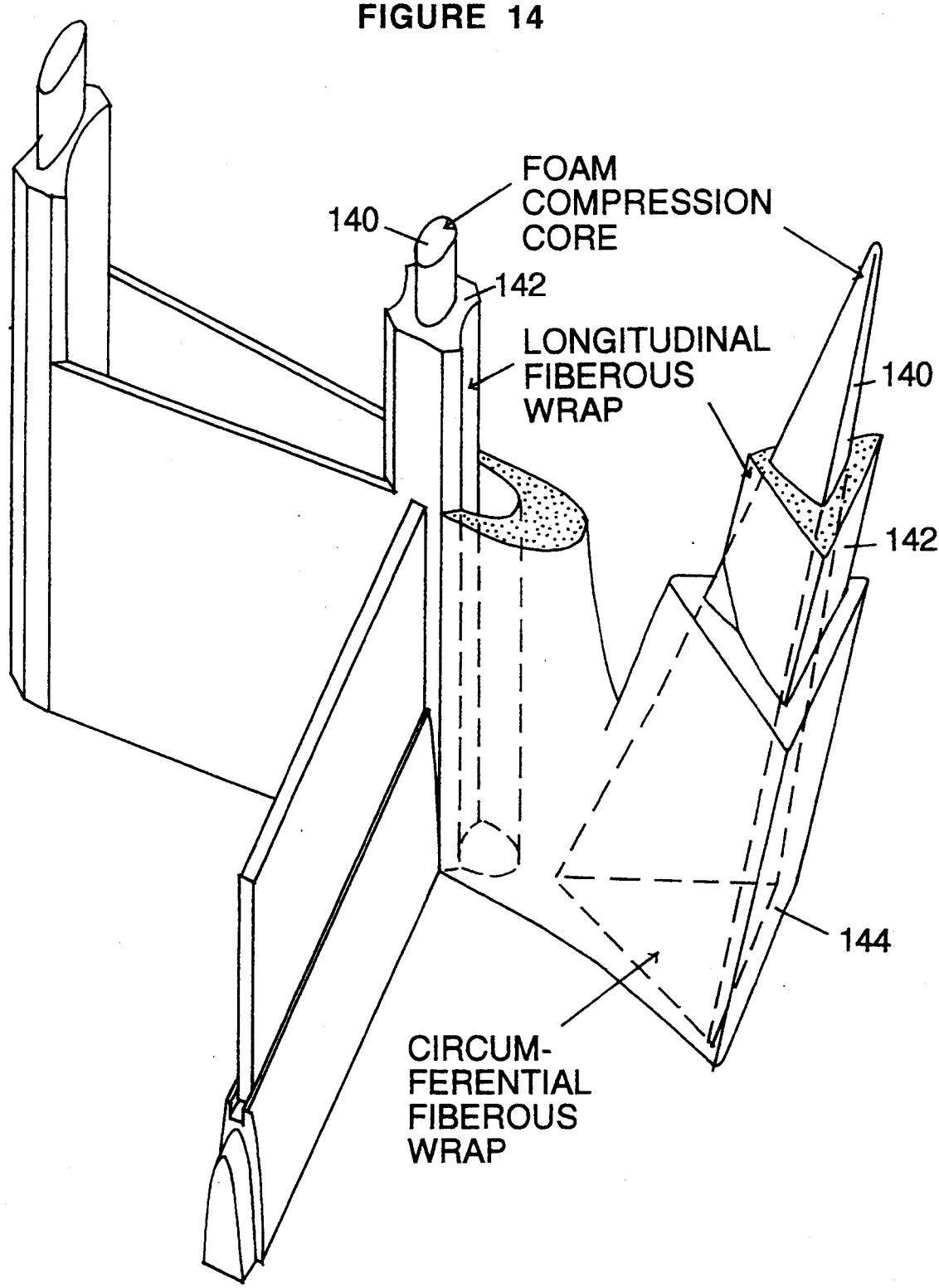
FIG. 14 is an illustration of novel construction made in accordance with the instant invention.

Finally, referring to FIG. 14 an unconventional structure is shown constructed using the structural glass material of the invention. The structure defies conventional description, and therefore represents a potential branching away from conventional construction logic. In the structure of FIG. 14 foam compression cores 140 are provided in differing shapes, dependant on the overall structure. These foam cores are then wrapped with longitudinal fibrous wraps 142. Finally the entire structure is wrapped with a circumferential fibrous wrap 144. Resolution of compression, bearing, and bending stresses are all implicit, but the structure is neither column nor beams.

As can be seen the construction and use of the structural glass of the instant invention has many uses and may be applied to almost all traditional areas of construction technology. Although not shown explicitly, it is anticipated that a number of additional applications include:

Space-frame joints in which the nodal compression elements are made by wrapping tensile fibrous material around a polyhedral foam core;

Torsionally loaded cantilevers and bending elements, with fibers accurately following the tensile stress trajectories;

Column-beam joint solutions allowing variable angular attachment. etc.

In summary, then, a composite structural foamed glass material constructed in accordance with the teachings of the invention will have significant value in architecture; especially in the light of its potential energy efficiency, material efficiency, insulation characteristics, low density, corrosion resistance, and formal versatility. Compression testing of the glass foam suggests desirable strength and failure characteristics that are rarely encountered in new materials of architectural interest.

In addition to architectural applications, it is anticipated that many applications for the whole group of foam and fibrous composites in furniture design, aeronautics, naval architecture, and industrial engineering.

Accordingly, it will thus be seen that the objects set forth above, among those made apparent from the preceding description are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It will also be understood that the following claims are intended to cover all of the generic and specific features of the invention, herein described, and all statements of the scope of the invention which, as a matter of language, might be said to fall there between.

What is claimed is:

1. An improved structural glass for use as an architectural building material comprising:
    a foamed glass core structure, and;
    a sheath structure;
    said sheath structure surrounding a least a portion of said foamed glass core structure;
    said foamed glass core structure comprising, in a mixture, glass and bubbles of gas introduced into said glass, said foamed glass core structure being heterogeneous in composition such that the application of forces to said foamed glass core structure will result in a crushing failure of said foamed glass core structure rather than a fracture failure of said foamed glass core structure as the expected propagation of said fracture failure will be impeded from moving through said foamed glass core structure by said bubbles of gas;
    said sheath structure further comprising a fiber component and a matrix component to support said fiber component in said sheath structure, the melting temperature of said matrix component being lower than the melting temperature of said fiber component, the modulus of elasticity of said matrix component being lower than the modulus of elasticity of said fiber component;
    whereby an improved structural glass is provided for use as an architectural building material where said foamed glass core increases the structural strength of said building material when compressive forces are applied to said building material and where said sheath structure increases the structural strength of said building material when tensile forces are applied to said building material.

2. The improved structural glass, as claimed in claim 1, wherein said bubbles of gas are distributed evenly throughout said foamed glass core structure.

3. The improved structural glass, as claimed in claim 2, wherein said bubbles of gas are introduced into said foamed glass core structure by bubbling an inert gas into said foamed glass core structure.

4. The improved structural glass, as claimed in claim 3, wherein the introduction of bubbles of gas into said foamed glass core structure is accomplished by the entrapment of a gas within said foamed glass core structure.

5. The improved structural glass, as claimed in claim 3, wherein the introduction of bubbles of gas into said foamed glass core structure is accomplished through the inducement of a chemical reaction within said foamed glass core structure, resulting in bubbles of gas which will remain in gaseous form trapped within said foamed glass core structure.

6. The improved structural glass, as claimed in claim 2, wherein said foamed glass core structure is uniformly deformed subsequent to the introduction of said bubbles of gas into said foamed glass core structure.

7. The improved structural glass, as claimed in claim 2, wherein said foamed glass core structure is deformed in a non-uniform manner subsequent to the introduction of said bubbles of gas into said foamed glass core structure such that said deformation will be greater in some areas of said foamed glass core structure than in other areas of said same foamed glass core structure.

8. The improved structural glass, as claimed in claim 1, wherein said bubbles of gas are distributed unevenly throughout said foamed glass core structure.

9. The improved structural glass, as claimed in claim 1, wherein said fiber component of said sheath structure is formed from an inorganic material.

10. The improved structural glass, as claimed in claim 1, wherein said fiber component of said sheath structure and said matrix component of said sheath structure are both formed by the controlled deformation of said foamed glass core structure so that a portion of the resultant deformed foamed glass core increases the structural strength of said improved architectural building material in response to compressive forces and a portion of the resultant deformed foamed glass core increases the structural strength of said improved architectural building material in response to tensile forces.

11. The improved structural glass, as claimed in claim 1, wherein said foamed glass core structure is formed in the shape of a standard masonry unit used in building architectural structures.

12. The improved structural glass, as claimed in claim 1, wherein said foamed glass core structure is formed in the shape of a standard beam used in building architectural structures, the orientation of said fiber component of said sheath structure being aligned longitudinally in relation to the orientation of said beam.

13. The improved structural glass, as claimed in claim 1, wherein said foamed glass core structure is formed in the shape of a standard axial compression unit used in building architectural structures, said sheath structure comprising a first axial sheath structure and a second axial sheath structure, said foamed glass core structure being at least partly surrounded by said first axial sheath structure, the orientation of said fiber component of said first axial sheath structure being aligned longitudinally in relation to the orientation of said axial compression unit, said first axial sheath structure being further surrounded at least partly by said second axial sheath structure, the orientation of said fiber component of said second axial sheath structure being aligned circumferentially in relation to the orientation of said axial compression unit.

14. The improved structural glass, as claimed in claim 1, wherein said sheath structure comprises a first sheath element and a second sheath element, each of said first sheath element and said second sheath element comprising both a fiber component and a matrix component, said second sheath element surrounding at least a portion of said first sheath element, the fiber component of said second sheath element being oriented in a direction which is different from the direction of orientation of the fiber component of said first sheath component such that said first sheath element will increase the structural strength of said building material when tensile forces are applied to said building material in a first direction and wherein said second sheath component will increase the structural strength of said building material when tensile forces are applied to said building material in a second direction.

* * * * *